US007085409B2

United States Patent
Sawhney et al.

(10) Patent No.: US 7,085,409 B2
(45) Date of Patent: Aug. 1, 2006

(54) METHOD AND APPARATUS FOR SYNTHESIZING NEW VIDEO AND/OR STILL IMAGERY FROM A COLLECTION OF REAL VIDEO AND/OR STILL IMAGERY

(75) Inventors: Harpreet Singh Sawhney, West Windsor, NJ (US); Hai Tao, Lawrenceville, NJ (US); Rakesh Kumar, Monmouth Junction, NJ (US); Keith Hanna, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 741 days.

(21) Appl. No.: 09/978,158

(22) Filed: Oct. 16, 2001

(65) Prior Publication Data

US 2002/0061131 A1 May 23, 2002

Related U.S. Application Data

(60) Provisional application No. 60/250,651, filed on Dec. 1, 2000, provisional application No. 60/241,261, filed on Oct. 18, 2000.

(51) Int. Cl.
G06K 9/00 (2006.01)
G06T 15/00 (2006.01)
G06T 15/40 (2006.01)

(52) U.S. Cl. ........................ 382/154; 345/419; 345/422

(58) Field of Classification Search ................ 345/955, 345/419, 422; 382/285, 154; 348/42, 47; 352/86
See application file for complete search history.

(56) References Cited

U.S. PATENT DOCUMENTS

| 5,745,668 | A | 4/1998 | Poggio et al. |
| 5,821,943 | A | 10/1998 | Shashua |
| 5,917,937 | A | 6/1999 | Szeliski et al. |
| 5,999,662 | A | 12/1999 | Burt et al. |
| 6,009,188 | A | 12/1999 | Cohen et al. |
| 6,075,905 | A | 6/2000 | Herman et al. |
| 6,078,701 | A | 6/2000 | Hsu et al. |
| 6,084,979 | A | 7/2000 | Kanade et al. |
| 6,166,744 | A | 12/2000 | Jaszlics et al. |
| 6,198,852 | B1 | 3/2001 | Anandan et al. |
| 6,268,846 | B1* | 7/2001 | Georgiev ..................... 345/419 |
| 6,445,815 | B1* | 9/2002 | Sato ........................... 382/154 |
| 6,469,710 | B1* | 10/2002 | Shum et al. ................. 345/619 |
| 2001/0043737 | A1* | 11/2001 | Rogina et al. ............... 382/154 |

(Continued)

OTHER PUBLICATIONS

H. Sawhney, "3D Geometry from Planar Parallax". IEEE, 1994.*

(Continued)

*Primary Examiner*—Vikkram Bali
*Assistant Examiner*—Wes Tucker
(74) *Attorney, Agent, or Firm*—Lowenstein Sandler

(57) ABSTRACT

An image-based tele-presence system forward warps video images selected from a plurality fixed imagers using local depth maps and merges the warped images to form high quality images that appear as seen from a virtual position. At least two images, from the images produced by the imagers, are selected for creating a virtual image. Depth maps are generated corresponding to each of the selected images. Selected images are warped to the virtual viewpoint using warp parameters calculated using corresponding depth maps. Finally the warped images are merged to create the high quality virtual image as seen from the selected viewpoint. The system employs a video blanket of imagers, which helps both optimize the number of imagers and attain higher resolution. In an exemplary video blanket, cameras are deployed in a geometric pattern on a surface.

15 Claims, 9 Drawing Sheets

U.S. PATENT DOCUMENTS

2002/0171666 A1* 11/2002 Endo et al. ................. 345/619

OTHER PUBLICATIONS

H. Sawhney, "Simplifying Multiple Motion and Structure Analysis Using Planar Parallax and Image Warping". IEEE, 1994.*

R. Kumar, P. Anandan, and K. Hanna, "Shape Recovery from Multiple Views: A Parallax Based Approach". Sarnoff Technical Report, 1994.*

S. Laveau and O. Faugeras, "3-D Scene Representation as a Collection of Images". IEEE, 1994.*

L. McMillan and G. Bishop,"Plenoptic Modeling: An Image Based Rendering System". ACM-SIGGRAPH, 1995.*

S. Seitz and C. Dyer, "View Morphing". ACM-SIGGRAPH, 1996.*

S. Gortler et al., "The Lumigraph". International Conference on Computer Graphics and Interactive Techniques: Proceedings o the 23rd annual conference on Computer graphics and interactive techniques, 1994.*

W. Mark, L. McMillan, G. Bishop, "Post-Rendering 3D Warping". ACM-SIGGRAPH, 1997.*

K. Moravec et al., "Using an Image Tree to Assist Stereo Matching". IEEE, 1999.*

M. Black and A. Jepson, "Estimating Optical Flow in Segmented Images Using Variable-Order Parametric Models with Local Deformation". IEEE, 1996.*

H. Tao and H. Sawhney. "Global Matching Criterion and Color Segmentation Based Stereo". Sarnoff Technical Paper, Dec. 2000.*

H. Sawhney et al. "Hybrid Stereo Camera: An IBR Approach for Synthesis of Very High Resolution Stereoscopic Image Sequences". ACM-SIGGRAPH, Aug. 2001.*

Shade et al. "Layered Depth Images", ACM-SIGGRAPH 1998.*

H. Tao, H. Sawhney and R. Kumar. A Global Matching Framework. IEEE, Jul. 2001.*

S.E. Chen and L. Williams. "view Interpolation for Image Synthesis". ACM-SIGGRAPH 1993.*

H. Saito, S. Baba, M. Kimura, S. Vedula, and T. Kanade, "Appearance-Based Virtual View Generation of Temporally-Varying Events from Multi-Camera Images in the 3D Room", Tech. Rep.—CMUCS99127, Computer Science Department, Carnegie Mellon University, 1999.*

W. Luo and H. Maître, "Using Surface Model to Correct and Fit Disparity Data in Stereo Vision", IEEE, 1990.*

E. Trucco and A. Verri, "Introductory Techniques for 3-D Computer Vision" © 1998, Prentice-Hall, Chapters 7-8.*

O. Faugeras et al., 3-D Reconstruction of Urban Scenes from Sequences of Images, INRIA, 1995.*

M. Kimura et al; "3D Voxel Construction Based on Epipolar Geometry"; The Robotics Institute, Carnegie Mellon University.

H. Saito et al.; "Appearance-Based Virtual View Generation of Temporally-Varying Events from Multi-Camera Images in the 3D Room"; School of Computer Science, Carnegie Mellon University, Apr. 29, 1999.

PCT International Search Report, Mar. 29, 2002.

* cited by examiner

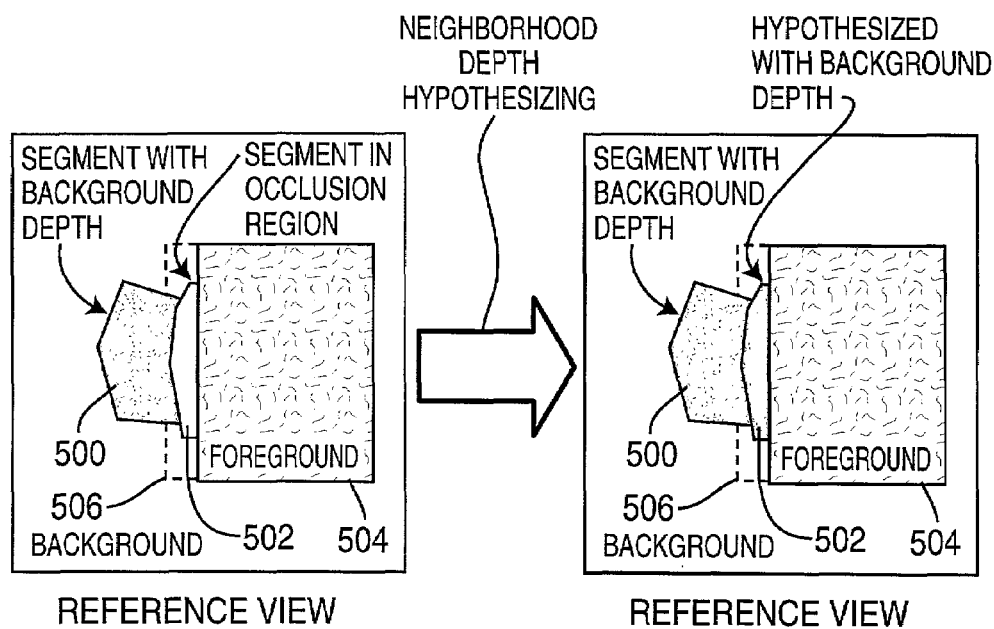
FIG. 4
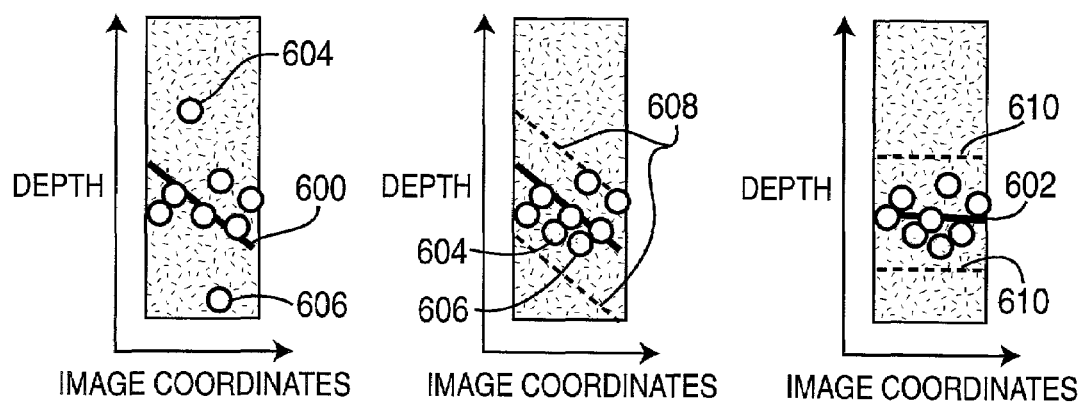
FIG. 5a  FIG. 5b  FIG. 5c

US 7,085,409 B2

METHOD AND APPARATUS FOR SYNTHESIZING NEW VIDEO AND/OR STILL IMAGERY FROM A COLLECTION OF REAL VIDEO AND/OR STILL IMAGERY

This application claims the benefit of U.S. Provisional Patent Application Ser. No. 60/241,261, filed Oct. 18, 2000 and U.S. Provisional Patent Application Ser. No. 60/250,651, filed Dec. 1, 2000, the contents of which are incorporated herein by reference.

The U.S. Government has a paid-up license in this invention and the right in limited circumstances to require the patent owner to license others on reasonable terms as provided for by the terms of contract nos. DAAB07-98-D-H751 and N00019-99-C-1385 awarded by DARPA.

FIELD OF THE INVENTION

The present invention is directed toward the domain of image processing, in particular toward the creation of virtual images seen from arbitrary viewpoints from at least two real images.

BACKGROUND OF THE INVENTION

Tremendous progress in the computational capability of integrated electronics and increasing sophistication in the algorithms for smart video processing has lead to special effects wizardry, which creates spectacular images and otherworldly fantasies. It is also bringing advanced video and image analysis applications into the mainstream. Furthermore, video cameras are becoming ubiquitous. Video CMOS cameras costing only a few dollars are already being built into cars, portable computers and even toys. Cameras are being embedded everywhere, in all variety of products and systems just as microprocessors are.

At the same time, increasing bandwidth on the Internet and other delivery media has brought widespread use of camera systems to provide live video imagery of remote locations. This has created a desire for an increasingly interactive and immersive tele-presence, a virtual representation capable of making a viewer feel that they are truly at the remote location. In order to provide coverage of a remote site for a remote tele-presence, representations of the environment need to be created to allow realistic viewer movement through the site. The environment consists of static parts (building, roads, trees, etc.) and dynamic parts (people, cars, etc.). The geometry of the static parts of the environment can be modeled offline using a number of well-established techniques. None of these techniques has yet provided a completely automatic solution for modeling relatively complex environments, but because the static parts do not change, offline, non-real time, interactive modeling may suffice for some applications. A number of commercially available systems (GDIS, PhotoModeler, etc.) provide interactive tools for modeling environments and objects.

For general modeling of static scenes, site models provide a viable option. However, site models do not include appearance representations that capture the current and changing appearance of the scene. The dynamic components of a scene cannot, by definition, be modeled once and for all. Even for the static parts, the appearance of the scene changes due to varying illumination and shadows, and through modifications to the environment. For maintaining up-to-date appearance of the static parts of the scene, videos provide a cost-effective and viable source of current information about the scene.

U.S. Pat. No. 6,084,979, "Method for Creating Virtual Reality," T. Kanade, P. J. Narayan, and P. Rander describes a method of creating images from virtual viewpoints using a dynamically changing internal representation. This internal representation is a three dimensional object-centered model of the scene which is created in a two step process from the images of 51 video cameras mounted in a hemispherical dome. Though the image quality of this system is generally high, the computational complexity of creating the necessary internal representation means that this system operates offline, which makes it unacceptable as an approach for tele-presence. Also the vast amount of video data that needs to be handled for each frame has lead the CMU group to reduce the frame rate to 6 Hz.

It has been previously demonstrated that current videos of a semi-urban environment can be aligned in near real-time to site models. The textured models can then be rendered using standard graphics pipelines. A visual metaphor for this process of combining models with videos is that of video flashlights. The multiple camera views at a given time instant can be considered as video flashlights capturing the scene appearance from their respective viewpoints. The multiple appearances are coherently combined with the model to provide multiple users the ability to navigate through the environment while viewing the current appearance from the video flashlights. A description of video flashlights is contained in "Pose Estimation, Model Refinement, and Enhanced Visualization using Video" by S. Hsu, S. Samarasekera, R. Kumar, and H. S. Sawhney which appears in CVPR2000.

While site models and the previously demonstrated video flashlights method provide for very impressive remote viewing systems, they fall somewhat short of the desired interactive tele-presence. For realistic tele-presence of dynamic objects such as human beings, not only the rendering, but also the modeling should be done in real-time. For example, as a person is moving around within a constrained environment such as a room or a courtyard, the users would like to virtually walk around the person under user control. In order to provide, continuously changing viewpoints under user control, it is desirable for representations of the dynamic object to be continuously built and maintained.

In the traditional graphics pipeline based rendering, scene and object models stored as polygonal models and scene graphics are rendered using z-buffering and texture mapping. The complexity of such rendering is dependent on the complexity of the scene. Standard graphics pipeline hardware has been optimized for high performance rendering.

In tele-presence applications with dynamic scenes, however, both modeling and rendering are desirably performed online in real-time. The method used needs to be applicable to a wide variety of scenes that include human objects, yet should not preclude capture and rendering of other scenes. Therefore, the assumption that a geometric model may be available is unrealistic. For human forms, it may be argued that assuming a generic model of the body and then fitting that model to images may be a viable approach. Still, there are unsolved issues of model to image correspondence, initialization and optimization that may make the approach infeasible.

Image-based modeling and rendering, as set forth in "Plenoptic Modeling: An Image-Based Rendering System" by L. McMillan and G. Bishop in SIGGRAPH 1995, has emerged as a new framework for thinking about scene modeling and rendering. Image-based representations and rendering potentially provide a mix of high quality rendering with relatively scene independent computational complexity. Image-based rendering techniques may be especially suitable for applications such as tele-presence, where there may not be a need to cover the complete volume of views in a scene at the same time, but only to provide coverage from a certain number of viewpoints within a small volume. Because the complexity of image-based rendering is of the order of the number of pixels rendered in a novel view, scene complexity does not have a significant effect on the computations.

For image-based modeling and rendering, multiple cameras are used to capture views of the dynamic object. The multiple views are synchronized at any given time instant and are updated continuously. The goal is to provide 360 degrees coverage around the object at every time instant from any of the virtual viewpoints within a reasonable range around the object.

In order to provide control of zoom for many users at the same time, it is not feasible to use zoom lenses and cameras. Physical control of zoom through zoom lenses can be done for only one viewpoint at a time, and only by one user. Synthetic control of resolution based on real data can provide a limited control of resolution. Typically, such a control may be able to provide at least 2×3 magnification without appreciable loss of quality.

Between the real cameras, virtual viewpoints may be created by tweening images from the two nearest cameras. Optical flow methods are commonly used by themselves to create tweened images. Unfortunately, the use of only traditional optical flow methods can lead to several problems in creating a tweened image. Particularly difficult are the resolution of large motions, especially of thin structures, for example the swing of a baseball bat; and occlusion/deocclusions, for example between a person's hands and body.

SUMMARY OF THE INVENTION

The present invention is embodied in an image-based tele-presence system, in which images are forward warped using local depth maps and then merged to form high quality virtual images. According to one aspect of the invention, this system uses an improved method to create a high quality virtual image, in real-time, as seen from a virtual viewpoint within a scene covered by a plurality of fixed electronic cameras. First, at least two images, from among the images produced by the fixed electronic cameras, are selected to be used in creating the high quality virtual image. The selected images are used to create depth maps corresponding to these images. Next warp parameters are calculated to warp the selected images to the virtual viewpoint using their corresponding depth maps and the images are then warped using these sets of warp parameters. Finally the warped images are merged to create the high quality virtual image as seen from the selected viewpoint.

According to another aspect of the invention, the system employs a color segmentation method to improve the quality and speed of local depth map calculations, particularly in textureless regions. First, the images are divided into segments of similar color (based on pixel values, or the combination of sub-pixel values) and an initial estimate depth of each segment is made. The depth is refined over a number of iterations in which the depth of each segment is optimized in turn, while holding the depth of the other segments fixed.

According to another aspect of the invention, the system employs a video blanket array of electronic cameras. This video blanket helps both optimize the number of cameras. In an exemplary video blanket, a plurality of cameras are deployed in a geometric pattern on a surface.

BRIEF DESCRIPTION OF FIGURES

FIG. 4 is a pair of drawings illustrating a scene to demonstrate color segmentation.

FIGS. 5a, 5b, and 5c are graphs illustrating the iterative planarization process.

DETAILED DESCRIPTION

Figure 1:
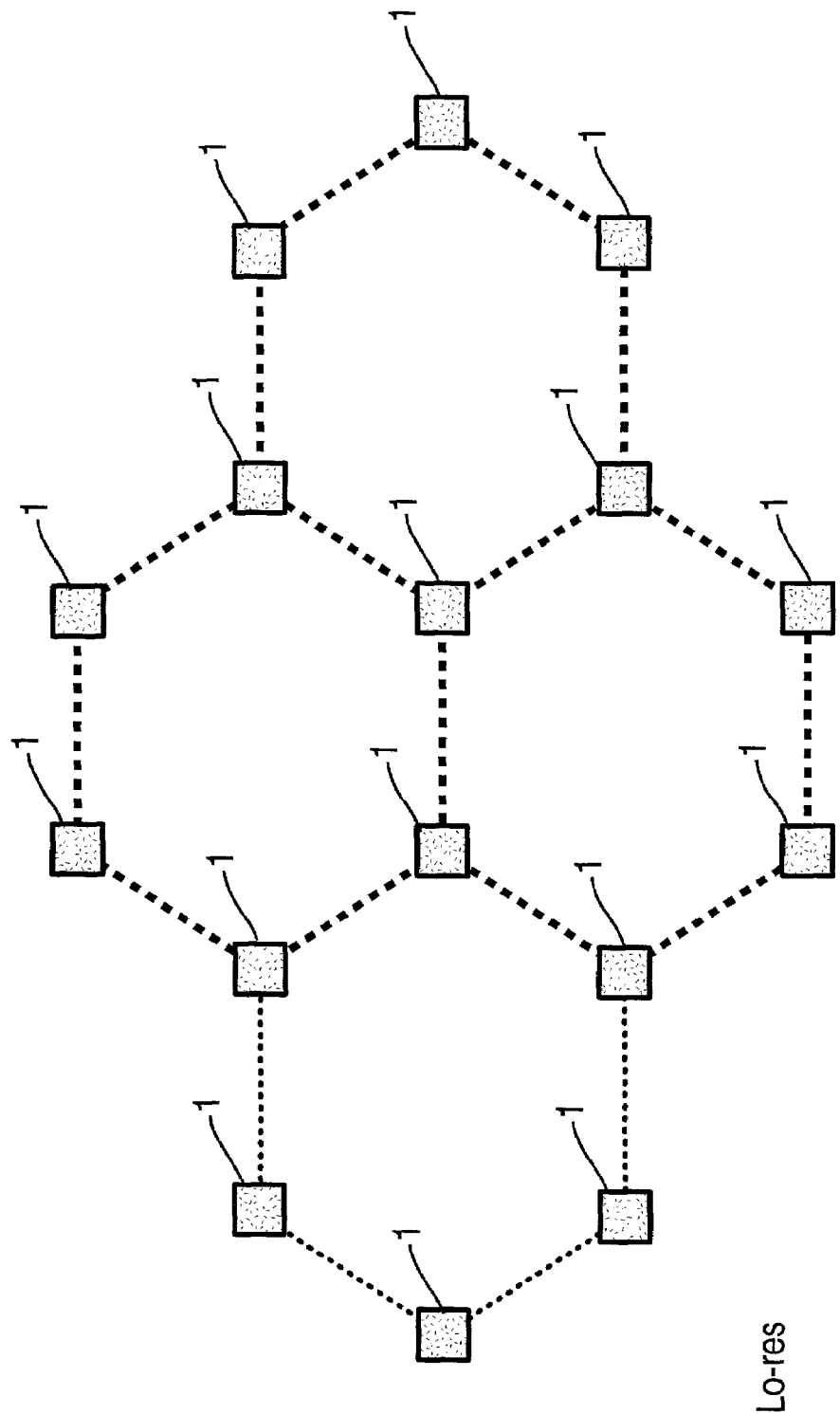
FIG. 1 is a schematic diagram demonstrating a hexagonal configuration of cameras used to provide efficient coverage of a scene.

The present invention overcomes many of the problems of previous approaches to interactive tele-presence. This is accomplished using a new image-based approach. The limitations of tradition optical flow based tweening can largely be overcome by capturing the scene in 3D and then rendering the scene from novel viewpoints. The key issue for real-time implementation of prior art global 3D representations is their requirement for centralized processing of all the views at each time instant. Improved algorithms and camera placement allow the present invention to circumvent these problems and attain a viable interactive tele-presence.

One important aspect of remote tele-presence is the ability to provide continuously changing viewpoints of the remote environment and, thus, provide a sense of stability and natural movement within the environment. In a practical system the viewpoints cover all the parts of the remote workspace that are relevant for a given application. For example, for a business meeting, it is natural to provide those views of the workspace/participants that a physically present human observer would see while sitting down or moving around. In addition, global panoramic and immersive views can be provided to show the complete environment. The ability to zoom-in on parts of the scene is also provided. Smooth transitions mimic the way humans explore a physical scene. An important aspect of such a tele-presence system is its unique feature of providing numerous users independent control over the view parameters within a wide range of viewpoints as well as camera zoom factors.

In an exemplary embodiment of the present invention, an array of cameras is used as a video blanket to provide the desired scene coverage. The cameras are arranged in an optimal way to maximize coverage while minimizing the overall number of pixels that need to be processed. Depth/parallax maps between the cameras are computed with the assistance of a color segmentation method, which is used to generate local shape maps. The local shape maps along with the resolution image data are then used to provide multiple resolution renderings not only from the viewpoints of the real cameras but also for virtual cameras located within the range of the real cameras.

Three different surfaces for video blanket configurations are used in the exemplary embodiment of the present invention, depending upon the desired geometry for virtual viewpoints. These surfaces are planar, tubular, and spheroidal. It should be noted that the tubular and spheroidal surfaces are not necessarily closed. Planar and tubular configurations both have cameras placed in a hexagonal pattern, i.e. at the vertices of hexagons which are tiled over the surface. In spheroidal configurations cameras may be placed as the carbon atoms in a fullerene are, at the vertices of an array of pentagons and hexagons which are tiled over the surface.

An algorithm for creating reliable local depth maps has been developed. Given relative poses and intrinsic parameters of multiple cameras in general positions and the corresponding positions of all scene points in the captured images, the 3D structure of a static scene can be recovered using a method called triangulation. Stereopsis is a non-invasive technique to achieve this goal through establishing image feature correspondence (correspondence matching) by machine analysis. In an exemplary embodiment of the present invention, the inventors use a 3D-reconstruction algorithm that employs a view-based volumetric representation of the scene.

A convenient method to produce the correspondence matching is to use optical flow. Large displacements or in general large disparities between pairs of cameras can not be handled by the standard optical flow algorithms, however, because such displacements may not be within the capture range of gradient or search based methods. Ideally, one would like to have the large capture range of search based algorithms and precision in the optical flow values generated by gradient based algorithms. To overcome the problems of large displacement and small object incompatibility found in traditional optical flow methods, and to increase their applicability, the inventors have designed a multi-hypothesis optical flow/parallax estimation algorithm that combines features of large range search and high precision of coarse-to-fine gradient methods.

The algorithm starts with a set of hypotheses of fixed disparity. Estimates of flow at each point are refined with respect to each of the hypotheses. The final optical flow is generated by selecting the best flow at each point. Once the depth information is derived from the local stereo image, new close-by views can be rendered using forward warping algorithms. In an exemplary embodiment, a mesh-based super-resolution algorithm has been implemented. Using the correct occlusion compatible traversal order, the warped images demonstrate convincing 3D effects. The four main components of this algorithm are flow rendering from depth image, depth transformation, mesh-based super resolution warping, and occlusion compatible traversal. Finally, the warped images from two or more cameras are merged to further improve image quality, particularly to improve handling of occlusion/deocclusions.

Exemplary modes of operation for such tele-presence systems are:

Observation Mode—Individuals use a tele-presence system to observe a remote location but without interacting with people or things at that location—to see, but be unseen. The user feels as if he is present in the scene without physically being there. Applications include:

Security: Guards (virtually and unobtrusively) walk around a facility, to observe activity of authorized personnel and check out possible intruders.

Travel: The user visits an unfamiliar city, and (virtually) walks along its streets to observe everyday life and culture.

Conversation Mode—Two or more individuals at different locations use a tele-presence system to converse with one another. The tele-presence system provides face to face visual contact comparable to a physical meeting. It allows individuals to make eye contact, see who is addressing whom, or see who is paying attention and who is looking away. Applications include:

Business video-conference meetings and virtual meetings between family and friends.

Interaction Mode—Two or more individuals use tele-presence to observe one another as they perform some common task. The system provides both observation and conversation capabilities—it allows one individual to observe what another is doing with his or her hands, while carrying on a conversation. Applications include:

War room: Military leaders at disparate locations share a (virtual) work environment, including workstation and wall displays showing mission activity, and walk around and talk to one another as if they were in the same room.

Tele-conferencing: Business people at remote locations take part in a meeting that includes common (virtual) work areas, such as white boards and viewgraph displays, while they walk around and talk to one another as if in the same room.

Operating room: A team of surgeons at disparate locations conducts an operation. Surgeons in the real operating room perform actual surgical steps, while surgeons at remote locations observe the patient in detail, provide advice, and demonstrate procedures in a virtual work-space.

Kitchen: Friends share a recipe and demonstrate preparation steps while each is in his or her own kitchen. They watch each other's hands, and look in the pots, and talk as if they were in the same room.

Sports: Friends at their own homes join one another in a virtual common arena to enjoy a broadcast sports event, viewing the event as if they were on the playing field.

The present invention focuses on how dynamic images taken of complex objects such as human subjects at close range can be captured to create a representation that is amenable to real-time rendering that covers wide range of views of the subject. To realize this goal, advances have been made in three areas:

Use of an optimized video blanket array of cameras;

An improved depth map estimation method, using color segmentation; and

Using a new image-based approach to create a tele-presence system, in which images are forward warped using local depth maps and then merged to form high quality virtual images.

FIG. 1 demonstrates an exemplary embodiment of a video blanket deployed on a planar surface to provide scene coverage by the cameras. FIG. 1 is a schematic diagram demonstrating a hexagonal configuration of cameras 1 used to provide efficient coverage of a scene. The horizontal elongation of the hexagons may be such that the aspect ratio of the hexagons is the same as that of the cameras used, alternatively, there may be no elongation in either the horizontal or vertical directions.

Both the spacing of the cameras and the extent of the video blanket (number of cameras) depend upon the specifics of the application. It should also be noted that, although the exemplary embodiment of the planar video blanket shown in FIG. 1 illustrates hexagons with major axes in the horizontal direction and slightly elongated in that direction, neither of these features is necessary.

As set forth above, it has been found that in tele-presence systems which use traditional optical flow tweening methods, suitable tweened images are obtained only when the maximum angular separation between cameras is less than 6°–8°. In the present invention angular separations between cameras as high as 30°–40° have been used to produce realistic and accurate tweened images.

The same hexagonal configurations of cameras may be deployed on a tubular surface to allow viewpoints that encircle the scene. If the tele-presence application does not use viewpoints from all 360°, then the video blanket need only have an angular extent equal to the angular extent of the desired viewpoints. Likewise, the linear extent of the tubular video blanket need only reach far enough to contain the desired linear viewpoints. It should be noted the linear orientation of the tubular surface may point in any direction, depending upon the specific application. Also, the tube need not be circular. In particular, coverage of an oval scene such as a stadium would be well suited to the video blanket approach. Although a non-circular tube leads to some additional calculational complexity, most of this additional complexity would take place offline while calculating input parameters describing camera placement and orientation. Therefore, video blankets on non-circular tubular surfaces may be used as easily as those on circular tubular surfaces. It is also possible to use a tubular surface with a changing perimeter, either in shape or length.

On a spheroidal surface, hexagons do not tile as nicely as they do on planar and tubular surfaces. As with tubular video blankets, spheroidal video blankets may not need to provide viewpoints from all possible angles and therefore may not have to cover the entire surface. Most often, spheroidal surfaces will be used when the tele-presence user desires viewpoints from at least a hemispheroidal region. For these applications the spheroidal video blanket may be composed of cameras placed at the vertices of hexagons and pentagons tiled together. Carbon atoms in fullerenes provide useful models of how to arrange the hexagons and pentagons for optimally tiling various spheroidal surfaces.

No matter which surface is employed, sometimes physical constraints of the tele-presence location prevent a number of the cameras from being placed in the optimal positions on the video blanket surface, or even on the surface at all. In this case the cameras should be placed as close to the optimal positions as possible and the discrepancies can be dealt with when calculating the input parameters for camera location and orientation. These changes in positioning may result in the use of additional cameras over the optimal setup, if some inter-camera angular separations exceed the maximum for the desired tele-presence.

Figure 2:
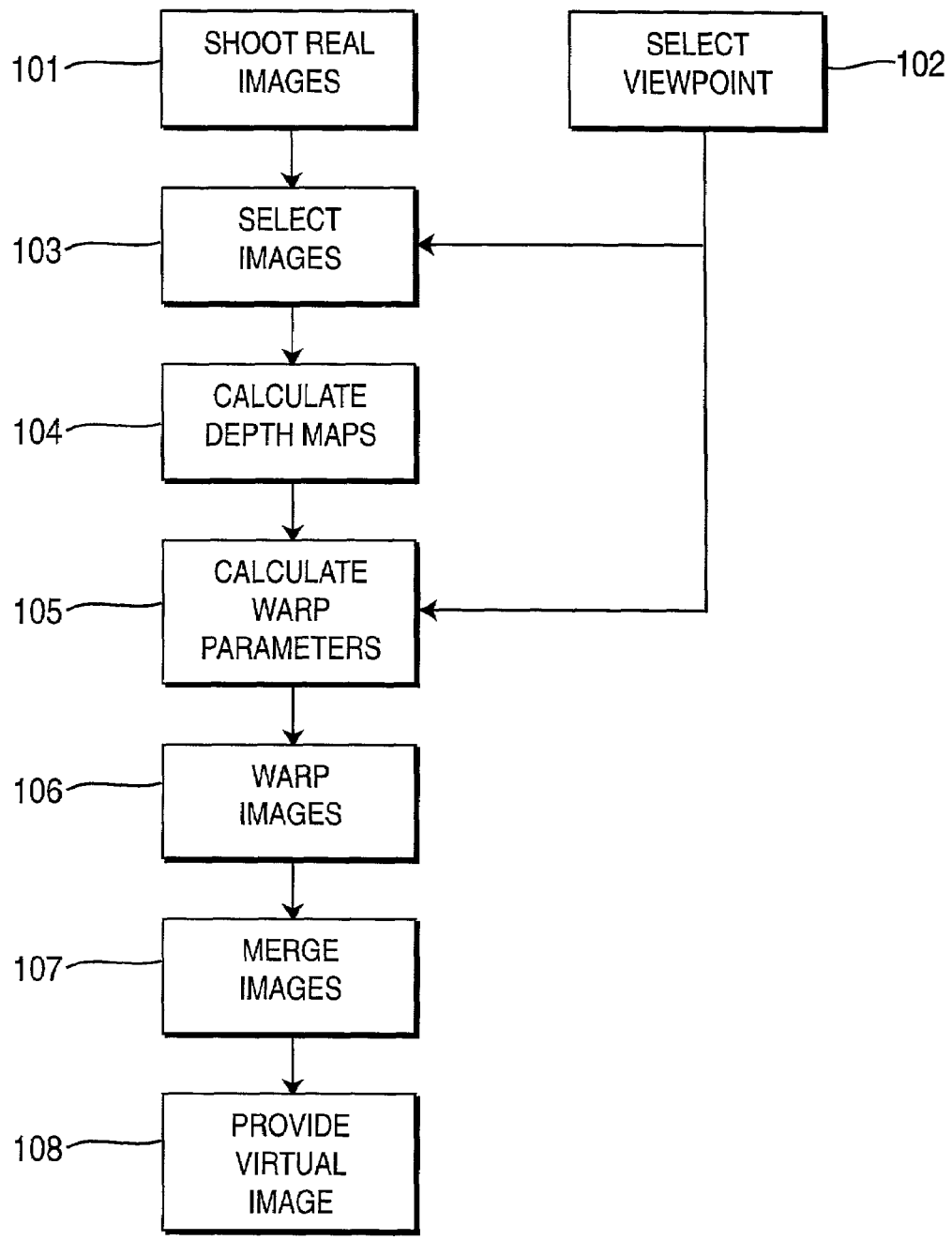
FIG. 2 is a flowchart of the method of this invention to create high quality virtual images.

To realize a system that can produce interactive tele-presence, it is desirable to have a reliable means of producing high quality virtual images in real-time from arbitrary viewpoints within the scene from a plurality of cameras. FIG. 2 is a flowchart showing the method of an exemplary embodiment of the present invention to create high quality virtual images.

In FIG. 2, real images are taken 101 and the viewpoint selected 102 first. Based on camera and viewpoint parameters, the system next chooses which images are to be used to create the high quality virtual image at step 103. For each selected image a local depth map is calculated 104. Next a calculation is performed 105 using the viewpoint parameters and information from the local depth maps to determine the warp parameters to be used to warp the real images to the selected viewpoint. The images are warped 106 to the selected viewpoint. Finally the warped images are merged 107 and provided 108 as a high quality virtual image of the scene as seen from the selected viewpoint.

Viewpoint selection at step 102 may be made interactively by a user employing a device such as a joystick, trackball, or mouse, or may be based on criteria such as user orientation and positioning. Viewpoint selection 102 may also be predetermined to follow a set trajectory or to follow certain features in the scene, or a combination of the above methods.

Image selection at step 103 usually selects the two or three best images based on the proximity of the real camera's position to the virtual viewpoint when the virtual viewpoint is approximately on the same surface as the cameras. When the viewpoint is significantly displaced from the surface defined by the cameras or when it is anticipated that there will be problems with occlusion/deocclusions the selection criteria may include images from cameras farther from the line of the virtual viewpoint, even cameras with orthogonal fields of view.

The local depth map calculation at step 104 may be accomplished in a number of ways that will be apparent to one skilled in the art. In an exemplary embodiment of the present invention a view-based volumetric method incorporating optical flow is used. In another exemplary embodiment of the present invention a color segmentation based stereo method is used to acquire the local depth map. These methods are chosen due to their amenability to real-time computation. The use of depth sensing, non-visual sensors such as range finders and structured light systems has also been contemplated.

Once the depth maps are known, warp parameters to warp the real images to the new viewpoint can be generated at step 105 using a depth based warping algorithm. Before the depth information derived in the reference image can be used it is desirably converted into the new view coordinate system for rendering purposes. Because the relative pose between the reference view and the new view is known, the depth transformation can be easily derived.

The inventors have determined that the depth, Z, of a pixel in the reference view may be expressed by equation (1).

$$Z = \frac{1}{\frac{1}{d_\pi} + k} = \frac{d_\pi}{1 + k d_\pi} \quad (1)$$

In equation (1), k is the parallax and $d_\pi$ is the distance from the frontal plane. Accordingly, the 3D coordinates of the point, P in an image matrix M are $P = M^{-1}[x,y,1]^T Z$. Using rotation and translation matrices R and T, respectively, its 3D coordinates in the new view are $P'=RM^{-1}[x, y,1]^T Z+T$ and the new depth is then derived. This depth information is useful, for example, when multiple warped images are blended using z-buffering.

By using the depth information, the image warping process 106 tends to produce the correct visibility (which part of the scene should be visible). Using techniques such as hole filling and image blending, exposed occluded image regions can be filled. Various techniques of image warping known to those skilled in the art may be used to forward warp the real images to the new viewpoint. Examples of forward warping techniques that may be used in the present invention are described in U.S. Pat. No. 5,963,213.

Figure 8:
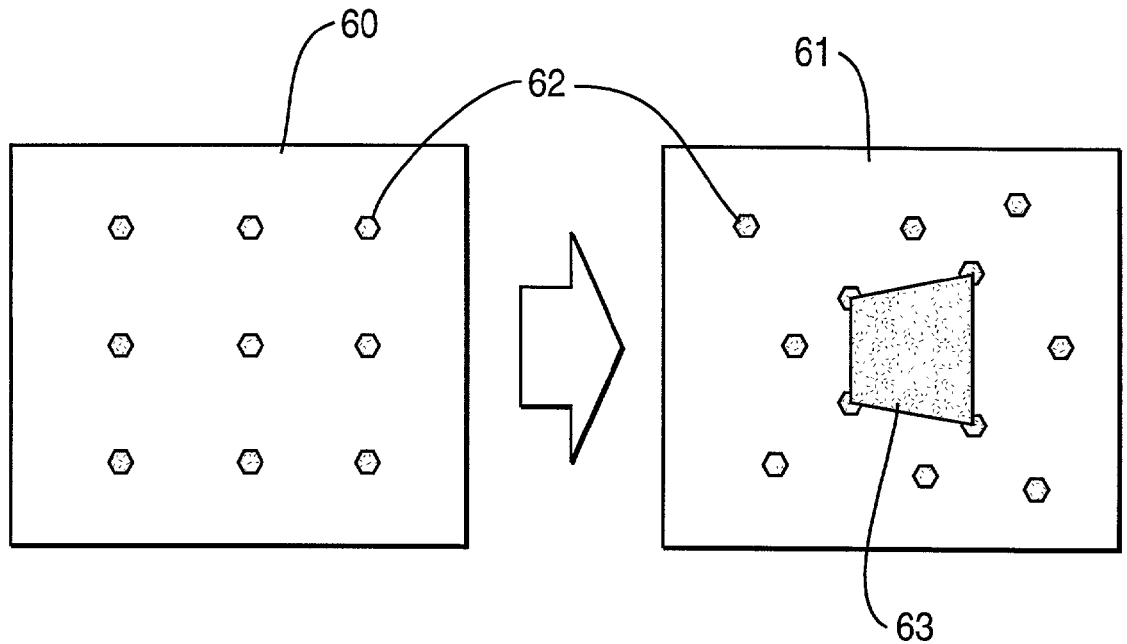
FIG. 8 is an image diagram that is useful for describing a mesh based splatting process used to improve the quality of warped images.

The method employed in an exemplary embodiment of the present invention is described in detail below with reference to FIG. 8.

When multiple local depth maps of the scene are recovered, new views may be synthesized by combining the warped images from these local views. In order to maintain correct visibility, depth information is desirably transformed into this new view as well. This is implemented by forward-warping the local depth image.

The warped images are then merged into a high quality virtual image. The image merging process 107 may be performed in any standard manner known to those skilled in the art with one caveat, missing pixels in the warped images do not contribute to the final image, either as part of an average or in a filtered value. In other words, any occluded features from one image are filled exclusively by information from images in which the feature is not occluded. In an exemplary embodiment of the present invention, when a feature has multiple values from multiple other warped images, the local depth maps are used to determine a merging method optimizes the representation of that feature. Examples of image merging methods that may be used in the present invention are described in U.S. patent application Ser. No. 09/274,064, METHOD AND APPARATUS FOR REMOVING BLANK AREAS FROM REAL-TIME STABILIZED IMAGES BY INSERTING BACKGROUND INFORMATION.

The final step 108 is to provide the high quality virtual image.

A variety of methods that rely on image matching under various constraints have been developed in stereo vision to create local depth maps. A review of early stereo vision work can be found in Structure from Stereo: A Review, by U. Dhond and J. Aggarwal, in IEEE Transactions on System, Man, and Cybernetics, vol. 19, no. 6, 1989. In one embodiment of the present invention, an exemplary color segmentation method of local depth estimation is used to improve estimation of dense scene structure using a generalized stereo configuration of a pair of cameras. As is the norm in stereo vision, it is assumed that the intrinsic camera parameters and the exterior pose information are provided. Extraction of dense 3D structure involves establishing correspondence between the pair of images.

Stereo matching has to deal with the problems of matching ambiguity, image deformations due to variations in scene structure, delineation of sharp surface boundaries, and unmatched regions due to occlusions/deocclusions in the two images. Typically in order to handle ambiguities in matching, window operations are performed to integrate information over regions larger than a pixel. This leads to the classical matching disambiguation versus depth accuracy trade-off. In areas with sufficient detail, small windows may provide enough matching information, but matching over a larger range of depth variations (disparities) may not be possible due to ambiguous matches.

One of the difficult tasks in many existing stereo algorithms is to find correct depth in textureless regions. Because small windows are inherently ambiguous in these regions, the depth map created by picking the best matching score is usually noisy.

An observation important to the exemplary color segmentation approach is that within a region of homogenous color, there is usually no large depth discontinuity. This observation implies that a depth representation based on segmenting the reference image into homogeneous color regions may be useful. A plane plus residual disparity representation for each color segment has been used to create an exemplary color segmentation method of local depth mapping. More specifically, in each color segment, the depth surface is modeled as a plane surface plus small depth variations for each pixel. Using this representation, the depth in textureless regions is guaranteed to be smooth. Further, a way of deriving reasonable depth estimates even for unmatched regions by hypothesizing depth of a given region based on neighboring regions may be employed.

This model guarantees smoothness in textureless regions. For smooth but textured regions, where many small segments are present, smoothness is not enforced across segments. However, depth estimation tends to be reliable in these areas even without the smoothness constraint.

It is to be emphasized that the color segmentation is not an end goal in this method. Over-segmentation of smooth surfaces is tolerated. Exemplarary embodiments of this invention are based on the generally valid heuristic that depth boundaries coincide with color segmentation boundaries. Association of color segments with semantic/object regions need not be attempted as, in general, color segmentation works. A way of initializing the representation for each segment is to compute an image-disparity based local matching score. Then find the best match for each pixel in a segment and fit a plane. A simple recursive algorithm adjusts the plane recursively.

Also, instead of trying to enforce global visibility based on local matching scores or along scan lines only, a more basic global matching criterion is employed. It states that if the depth is correct, the image rendered according to the depth into the second viewpoint should be similar to the real view from that viewpoint. This criterion follows the paradigm of analysis by synthesis and is the ultimate matching criterion. It provides a method for checking the goodness of any given depth map by enforcing global visibility. Accurate depth boundaries and thin structures can be obtained based on this criterion too.

Two immediate concerns regarding this approach are the huge solution space and the expensive synthesis process. For an image with N pixels suppose each pixel may have d different quantized depth values, the total number of different possible depth maps is $d^N$. An exhaustive search warps each of these configurations and finds the best configuration as the solution.

The second issue with the proposed approach is the cost of synthesis in every iteration. Even if the solution space is linear in the number of pixels, say 0.5N, it is still computationally impractical to warp the reference image 0.5N times to find the best depth map.

To solve with the first problem a color segmentation based representation and neighborhood depth hypothesizing method are combined in a local search algorithm. More important than computational considerations, this approach enforces depth smoothness in homogeneous color regions and also makes it possible to infer reasonable depth for unmatched regions.

A straightforward local greedy search algorithm may be used. In an exemplary algorithm, all the neighboring depth hypotheses of each segment are tested while all other segments are kept fixed. The neighborhood depth hypothesis that gives the best global matching score is recorded. After all segments have been tested, their depths are updated by choosing from the initial depth and the best neighborhood hypothesis according to the matching scores. This process is performed iteratively until either the total number of segments with depth changes is small or the number of iterations exceeds a certain value.

This process allows the correct depth to propagate because, by hypothesizing the correct depth, the warped image induces better matching. For example, the depth of a background segment may be wrongfully computed as the foreground depth because of the propagation of depth from a nearby textured foreground region. However, the error can be corrected if the background segment is hypothesized to have the depth of the correct neighboring background segment and that hypothesis wins. This process has been found to tolerate large initial depth errors.

Another benefit of the hypothesizing depths in neighborhoods is that it helps to derive reasonable depth for unmatched regions. For unmatched regions, the depth is more likely to be the extension of the neighboring background segment as shown in FIG. 4. The drawing in FIG. 4 illustrates three segments in a reference, segment 500 in the background, segment 504 in the foreground, and segment 502 which is occluded in a second image (not shown). The dotted line 506 illustrates the position of segment 504 in the second image. Since segment 502 appears in only one of the image it is not possible to obtain a certain depth. In the exemplary color segmentation method of the present invention the depth of segment may be hypothesized to be the same as the depth of segment 500 rather than left undefined. This estimate may be refined by information from additional images.

Figure 3:
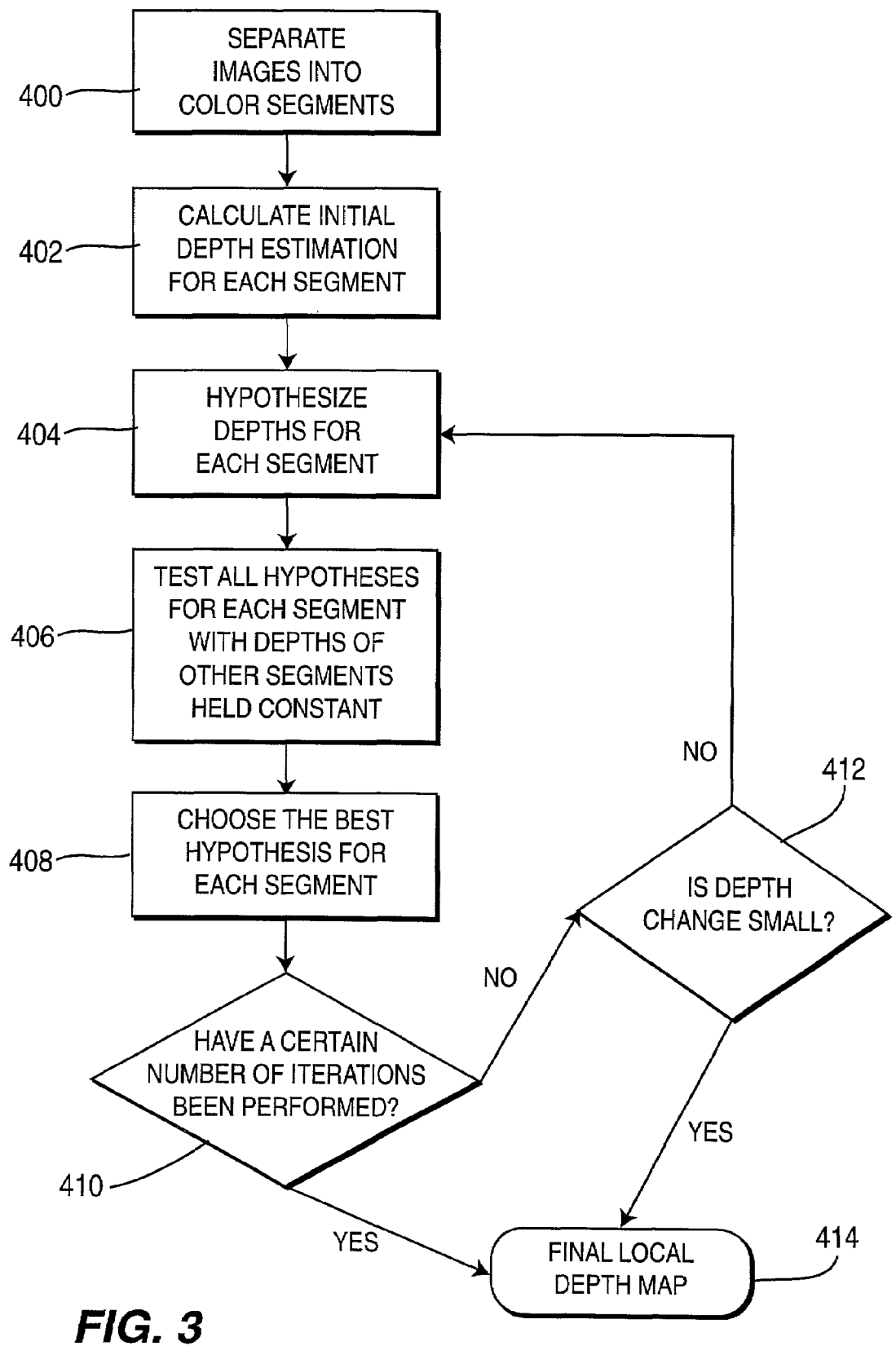
FIG. 3 is a flowchart of an exemplary method to create local depth maps using color segmentation.

FIG. 3 is a flowchart which illustrates the steps of this exemplary color segmentation method of creating local depth maps. First, the images are separated into color segments, step 400. Any algorithm that decomposes an image into homogeneous color regions will work for that purpose. The most important parameter in the algorithm is the range of pixel values (or the combined range of sub-pixel values) selected as a threshold for splitting a region into multiple sub-regions. If this range is small, the image can be over-segmented. If this range is large, the image is under-segmented. Because the exemplary algorithm enforces the depth continuity inside each segment strictly, under-segmentation should be avoided. The method proposed in *Robust Analysis of Feature Spaces: Color Image Segmentation*, by D. Comaniciu and P. Meer, in Proceedings of IEEE Conference on Computer Vision and Pattern Recognition, 1997 is one such method that may be used.

Next, an initial depth estimate is made for each segment, step 402 in FIG. 3. The three steps for the initial depth representation are (i) computing matching scores in an image-disparity volume, (ii) plane fitting in each segment, and (iii) residual disparity computation in each segment.

For the standard (parallel) stereo setup, the correspondence of a point in the second view lies on the same scan line as the reference view. The horizontal displacement of the corresponding point is called disparity. Similarly, for any arbitrary two views, the matching point lies on the epipolar line in the second image. For a standard stereo setup, to compute the dense point correspondence, matching scores in an image-disparity volume are first computed. More specifically, the matching scores for all possible horizontal displacements (within a range and with a fix displacement interval) are computed first. This forms a three-dimensional matching score array, which we call image-disparity matching volume. Each cell (x, y, d) holds the matching score for the correlation between pixel (x, y) in the reference image and (x+d, y) in the second image. Then, for each pixel, the best score is picked and the corresponding displacement is transformed into depth. The same idea may be applied to arbitrary views, except that the formulation is more complicated. In both cases, the isodisparity surface is a frontal plane in the reference view.

Once the image-disparity matching volume is computed, a plane is fitted for each color segment. We first find the best depth value for each pixel in the segment and then compute the best fit plane to the depth values. More specifically, the plane equation in each segment is given by equation (2).

$$Z_p = 1/Z = ax + by + c \qquad (2)$$

Where (x, y) is an image point, and Z is its depth in the reference camera coordinate system. Then, a, b, c are the least squares solution of a linear system shown in equation (3).

$$A[a, b, c]^{t=B} \qquad (3)$$

Where each row of A is the [x, y, 1] vector for a pixel and each row of B is its corresponding 1/Z.

An iterative fitting process may be adopted to reduce the effect of outliers. This idea is illustrated in FIGS. 5a–5c. First, the depth of every pixel in the image is decided by picking the best matching score. Matching scores may be calculated by a number of measures such as normalized correlation matching (or sum of absolute difference) score of a gray level or color window around the point, similarity in motion between neighboring pixels etc. Different approaches for checking for alignment quality are described in a U.S. patent application Ser. No. 09/384,118, METHOD AND APPARATUS FOR PROCESSING IMAGES by K. Hanna, R. Kumar, J. Bergen, J. Lubin, H. Sawhney.

Once the best matching scores have been determined, plane 600 is fitted in a segment. In the next iteration, the depth of each pixel is chosen within a given range 608 of the fitted plane by finding the best matching score in that range. In FIG. 5b outlying pixels 604 and 606 have been changed to fit within range 608. The plane parameters are updated accordingly based on these depths. FIG. 5c illustrates new plane 602 and new range 610. This process iterates several times until the plane parameters do not change significantly. This process is particularly useful for fitting planes in large textureless regions where matching ambiguities occurs. More generally, any other robust method of plane fitting like M-estimation, least median squares or RANSAC may be employed.

This exemplary representation allows small variations from the planar model in each segment. The actual depth of each pixel is shown in equation (4).

$$1/Z = Z_p + Z_r \qquad (4)$$

Once the plane parameters are determined, for each pixel, $Z_p$ is known. $Z_r$ is computed by locating the best match in the image-disparity volume within a small range of $Z_p$. Residual disparity $Z_r$ is smoothed in each segment to obtain the initial color segmentation based depth representation.

The next step in FIG. 3, step 404, is to create a number of depth hypotheses for each color segment. A hypothesis for each segment is generated from each neighboring segment. The plane parameters of a given segment are replaced using those of a neighboring segment to create the hypothesis. Then residual disparity for each pixel is found by searching around the plane and smoothing within the given segment.

Figure 6A:
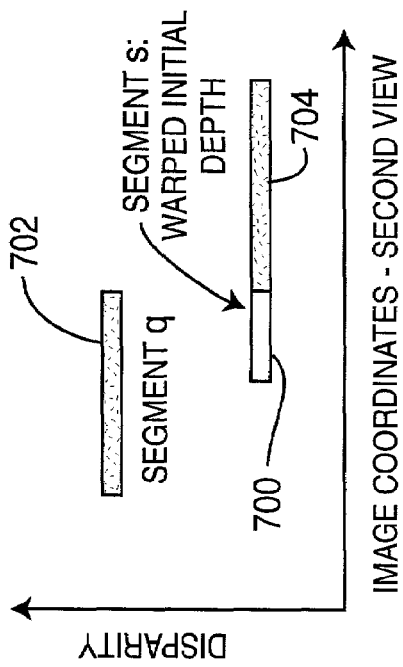
FIGS. 6a, 6b, 6c, and 6d are graphs illustrating fast hypothesis testing of hypothesized color segmentation depth maps.
Figure 6B:
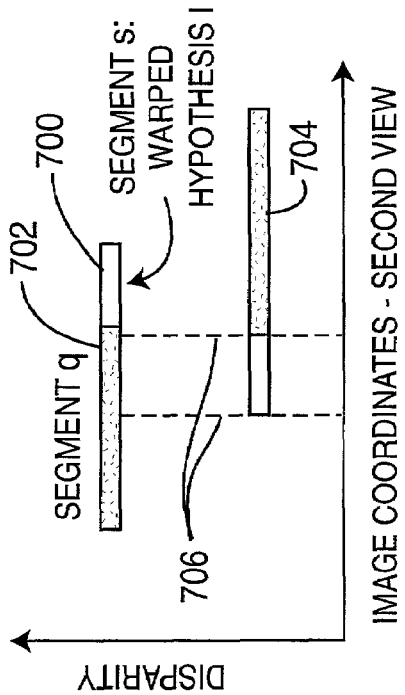
Figure 6C:
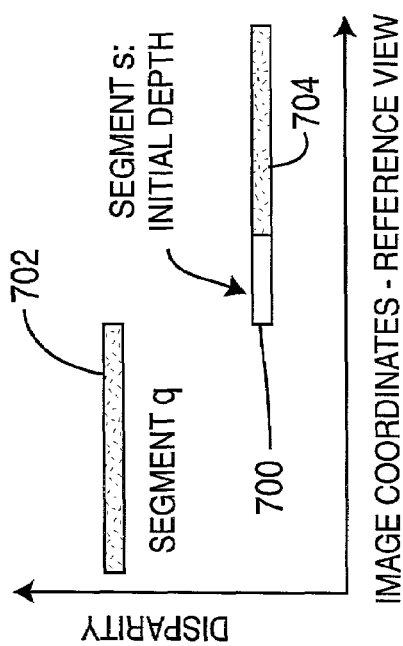
Figure 6D:
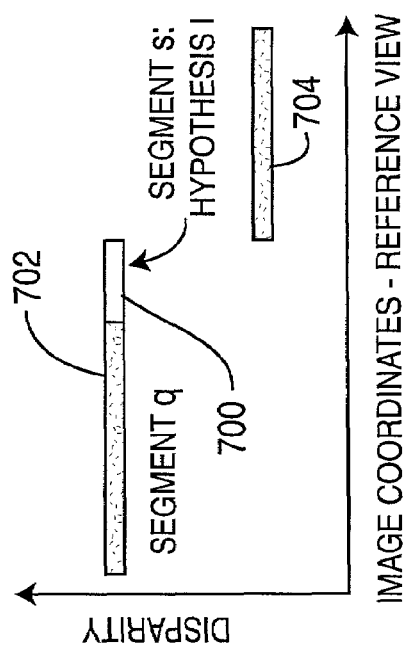

The depth hypotheses of a single segment are then tested while all the other segments maintain the initial depth, step 406. The depth representations are updated after testing is done for all segments. Since only the depth of one segment is changed each time, only a small portion of the image needs to be tested. An exemplary algorithm has been developed which takes advantage of this fact. This algorithm is illustrated in FIGS. 6a–6d. The reference image, FIG. 6a is first warped to the second view using the initial depth (i.e. initial depth hypothesis for each segment). We call this image the base warp, FIG. 6b.

Now if the depth of segment 700 is replaced by one of its neighborhood hypothesis, to compute its matching measure, we only need to consider those pixels affected by the depth change. For example, in FIG. 6c, the depth of segment 700 is changed. In the warped image, FIG. 6d, region 706 of segment 702 becomes visible while segment 700 becomes invisible. The matching score of the new depth map is computed by adding matching score of region 706 to the base warp score and subtracting matching score of segment 700. This example suggests an exemplary algorithm for testing these hypotheses.

In this exemplary algorithm, for the base warp, for each pixel, the warped depths, the segmentation ID's, and the matching scores of the two top-most layers are stored. Changes in the matching scores over base warp are computed by adding the matching scores of pixels that become visible and subtracting scores of pixels that become invisible. Since for each test, only the depth of one segment is changed, only the two top-most layers may become visible and information regarding those two layers should be recorded. The third layer will be blocked by at least one of the two layers originally in front of it and always invisible, therefore it does not affect the matching score.

The next step in FIG. 3, step 408, is to update the depth of each segment using the hypothesis with the best positive improvement. If none of the hypotheses gives positive improvement, keep the initial depth for that segment.

Next, it is determined if the process of improving the local depth maps has reached a predetermined maximum number of iterations, step 410. If this number has been reached the present depth map is selected as the final local depth map, step 414. If the number has not been reached, the most recent set of depth changes is analyzed, step 412. If the changes are less than a predetermined criterion, then the present depth map is selected as the final local depth map, step 414. Otherwise, the process returns to step 404 and another iteration of depth hypotheses begun. It should be noted that the exemplary ordering of steps 410 and 412 has been selected, since step 410 is less calculationally demanding, but these steps may be reversed, or either one may be omitted.

The plane plus small residual disparity representation may not be sufficient for objects with highly curved surfaces. It has been contemplated that more flexible depth representations may solve this problem. Also, it may occasionally occur that depth boundaries appear in homogeneous color segments. A method of hypothesizing splits in problematic segments, or intentional over-segmentation, may be used to overcome these issues.

Additionally it is noted that color segmentation may be used for optical flow computation, too. By replacing the depth based forward warping with occlusion compatible traversal warping these methods may be combined. When certain information, such as positions of epipoles is roughly known, this may prove an advantageous approach.

Another exemplary embodiment of the present invention uses a view-based volumetric method to create depth maps of the images. For simplicity, the concept of view-based volumetric method is illustrated with a standard two-camera rectified imaging system. Optical flow may be used to determine corresponding points with in the two images. From the epipolar geometry, for any image point in the first image (the reference image), its corresponding points in the second image (the inspection image) are both on a scan line that is parallel to the line separating the cameras. Finding correspondence along this line is a 1D searching problem. The amount of displacement in the inspection images is called disparity. For a 2D image, the total searching space is three-dimensional. This space can be parameterized using image coordinates and disparity and is called a scene volume. The view-based volumetric approach generates this volume by computing the goodness of the match for all disparity values of all pixels in the reference images. One possible solution can be achieved based on the disparity value with the maximum matching score for each pixel. Due to image noise, however, and matching ambiguity, the solution may be noisy or totally wrong. Various physical constraints of the scene can be imposed to regularize the solution. Computationally, these constraints are conveniently formulated as a relaxation process in the 3D volume.

Many scene structure constraints have been proposed. T. Poggio and D. Marr, in an article entitled "A Computational Theory of Human Stereo Vision" in Proceedings of the Royal Society, London B, 204, 1979, propose two constraints: cooperative constraints and uniqueness constraints. The cooperative constraint states that because matter is cohesive, disparity varies smoothly almost everywhere. The uniqueness constraint imposes the requirement that, for each pixel in the reference image, a unique depth should recovered to form the corresponding three dimensional voxel. In the view based volumetric representation, these two constraints are translated into two computation rules. Cooperative constraint means close-by voxels tend to have similar values. Uniqueness constraint requires that on each ray shooting from either the reference camera or the inspection camera, only one voxel is on the real physical surface.

Blindly using the cooperative constraint may cause problems near depth discontinuities. The textured portion of the image tends to grow into an adjacent textureless region. To overcome this problem, a figural continuity constraint can be introduced. This constraint states that if a smooth image region should not have large depth discontinuity. This is easily translated into a computational term in the 3D volume as stronger cooperation only happens when image intensity values are more similar. These two statement are not exactly the same, but because the textured region, in general, has better depth estimation, less cooperation does not cause a severe problem.

Suppose the value of each voxel in the 3D volume is $L_n(x, y, d)$ in iteration n. The local support, $S_n(x, y, d)$, gathered in the cooperative zone is given by equation (2);

$$S_n(x, y, d) = \sum_{(x',y',d') \in \Phi} e(x, y, x', y') L_n(x', y', d') \quad (2)$$

where $\Phi$ CD represents the cooperative zone, and e(x,y, x'y') is the similarity function for pixels (x,y) and (x',y') in the reference Image. To reinforce the uniqueness constraint, the inhibition, $R_a(x, y, d)$, for voxel (x,y,d) is given by equation (3)

$$R_n(x, y, d) = \frac{1}{\max_{(x',y',d') \in \Theta} S_n(x', y', d')} \quad (3)$$

where $\Theta$ is the inhibition zone. Overall, the updating formula is for voxel (x, y, d) is given by equation (4)

$$L_{n+1}(x, y, d) = L_o(x, y, d) \left( \frac{S_n(x, y, d)}{L_n(x, y, d)} \right)^\beta \quad (4)$$

The parameter $\beta$ controls the strength of uniqueness constraint. In an exemplary embodiment $\beta$=3.

The algorithm can be extended to an arbitrary imaging configuration by parameterizing the volume using image coordinates and parallax. Basically, parallax describes the amount of displacement in the inspection image along the epipolar line and can be viewed as generalized disparity. Parallax is a relative affine structure invariant to the pose of the inspection view. It provides the mechanism for integrating more than two views.

Because the correlation score of the initial volume is used through the relaxation process, it is preferable to use a robust correlation function. Two candidates are normalized autocorrelation and sum of squared differences. The normalized correlation is good for texture region but ill defined on smooth regions. The SSD on the other hand, is good for matching intensities but is sensitive to overall illumination change. In an exemplary embodiment of the present invention a linear combination of these two functions is used, as shown in equation (5).

$$L(x,y) = (1-\alpha)C(x,y) + \alpha \exp\{-SSD(x,y)/\sigma^2\} \quad (5)$$

is weighting factor for SSD. In an exemplary embodiment, $\alpha$=0.5.

In a two camera system without rectification, in order to traverse through the volume, it is desirable to compute the intersection of each ray with each parallax plane. This process is computationally expensive. To overcome this problem, an approximation is applied in an exemplary embodiment of the present invention. Because the purpose of traversing through the volume is to find the maximum values along a ray, this value may be stored for each ray shooting from the inspection image pixel. Then the position of each voxel in the inspection image is calculated. The value stored in the closest inspection pixel is then used. Because a voxel may be the maximum value along the inhibition rays, the two largest values along each ray are stored, as well as their respective depths.

A simple splatting based forward warping algorithm may be used to obtain pixel values in the warped images, but an algorithm of this type may cause blurred images or holes by using too large or too small a splatting kernel. The forward warping algorithm proposed by W. R. Mark and G. Bishop in their article entitled "Efficient Reconstruction Techniques for Post-Rendering 3D Image Warping" (UNC Computer Science Technical Report TR98-011, University of North Carolina, Mar. 21, 1998) may be used in an exemplary embodiment of the present invention. This algorithm solves the problem of image distortion by splatting pixels according to a mesh based internal representation. Depth discontinuity is detected as the stretch of the mesh exceeds a certain threshold. FIG. 8 illustrates the process used in the exemplary embodiment of the invention. The original reference image 60 and the corresponding flow 61 are first super sampled to higher resolution. Then, for each pixel 62 at that resolution, the quadrilateral 63 that surrounds it is found by averaging the position of its neighboring pixels 62. The value of the original pixel is then splatted into this quadrilateral area 63. Finally, the super-resolution image is down-sampled to the original size.

Figure 7B:
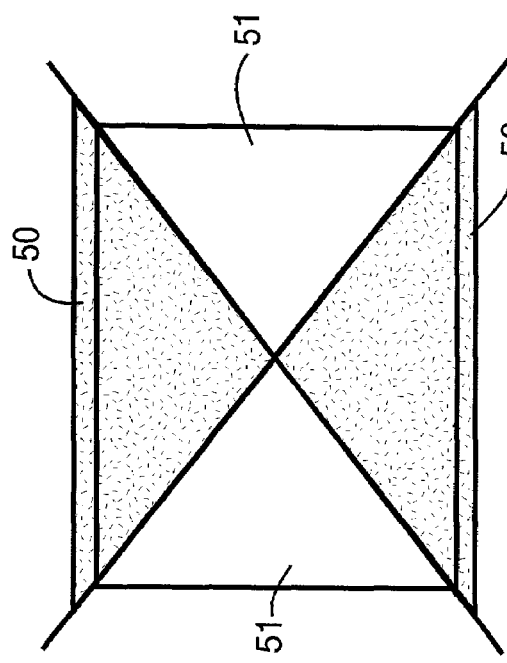
FIG. 7b is a diagram that indicates the two regions which determine the appropriate traversal order to be followed using the rows and columns of the image as guidelines.
Figure 7D:
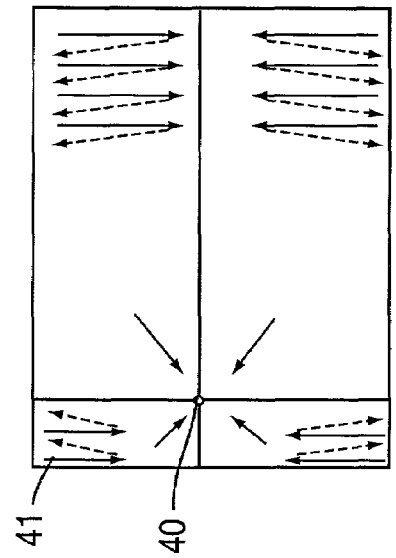
FIG. 7d is a diagram that demonstrates the 4-sheet vertical-horizontal traversal order where the epipole is a focus of contraction in region 51 shown in FIG. 7b.
Figure 7A:
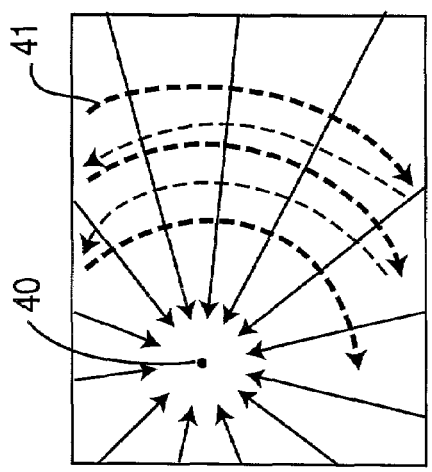
FIG. 7a is a diagram that illustrates an occlusion compatible traversal order method for warping of images in which the epipolar geometry is known.
Figure 7C:
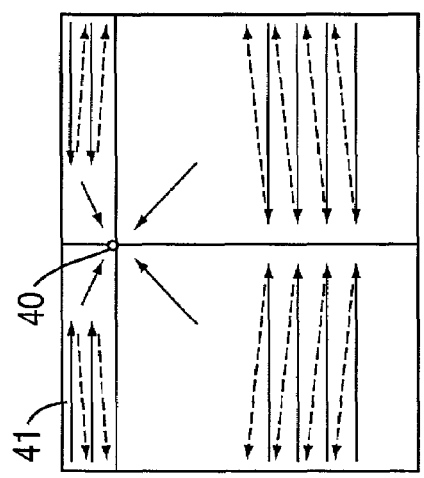
FIG. 7c is a diagram that demonstrates the 4-sheet horizontal-vertical traversal order where the epipole is a focus of contraction in region 50 of FIG. 7b.

Z-buffering is a rendering technique that is used to ensure correct visibility of objects in the rendered images. Z-buffering may be used in the present invention, but the computational demands make it a less than ideal choice for real-time applications. Another more efficient technique, used in an exemplary embodiment of the present invention and illustrated in FIGS. 7a–7d, is to warp pixels according to the occlusion compatible traversal order 41. Suppose the epipole 40 in the reference image is known, as shown in FIG. 7a, the ideal traversal order 41 is to move along a direction perpendicular to the epipolar lines, and concurrently move toward or away from the epipole 40 using the epipole 40 as the focus of contraction or the focus of expansion. In FIG. 7b, a rough approximate of this process is shown. When the epipole falls in the hatched region 50, a 4-sheet horizontal-vertical traversal order is used. When the epipole falls in region 51, a 4-sheet vertical-horizontal traversal order is used. FIGS. 7c and 7d illustrate these traversal orders, respectively, for the cases in which the epipoles are foci of contraction. This approximation works well even when the epipole 40 is outside the image.

Figure 9:
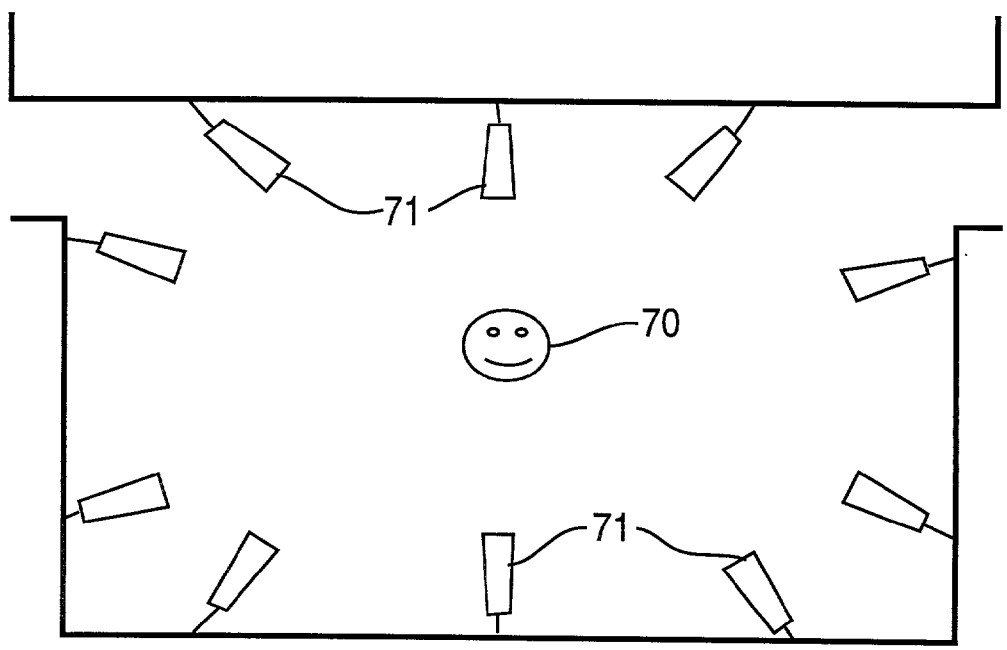
FIG. 9 is a top-plan view of a space to be imaged showing multiple cameras being used to capture images of a scene from a variety of angles.

FIG. 9 is a top-plan view of a space to be imaged showing multiple cameras 71 being used to capture images of a scene 70 from a variety of angles. In an exemplary embodiment of the present invention the cameras 71 are arranged in a video blanket configuration such as that shown in FIG. 1.

Figure 10:
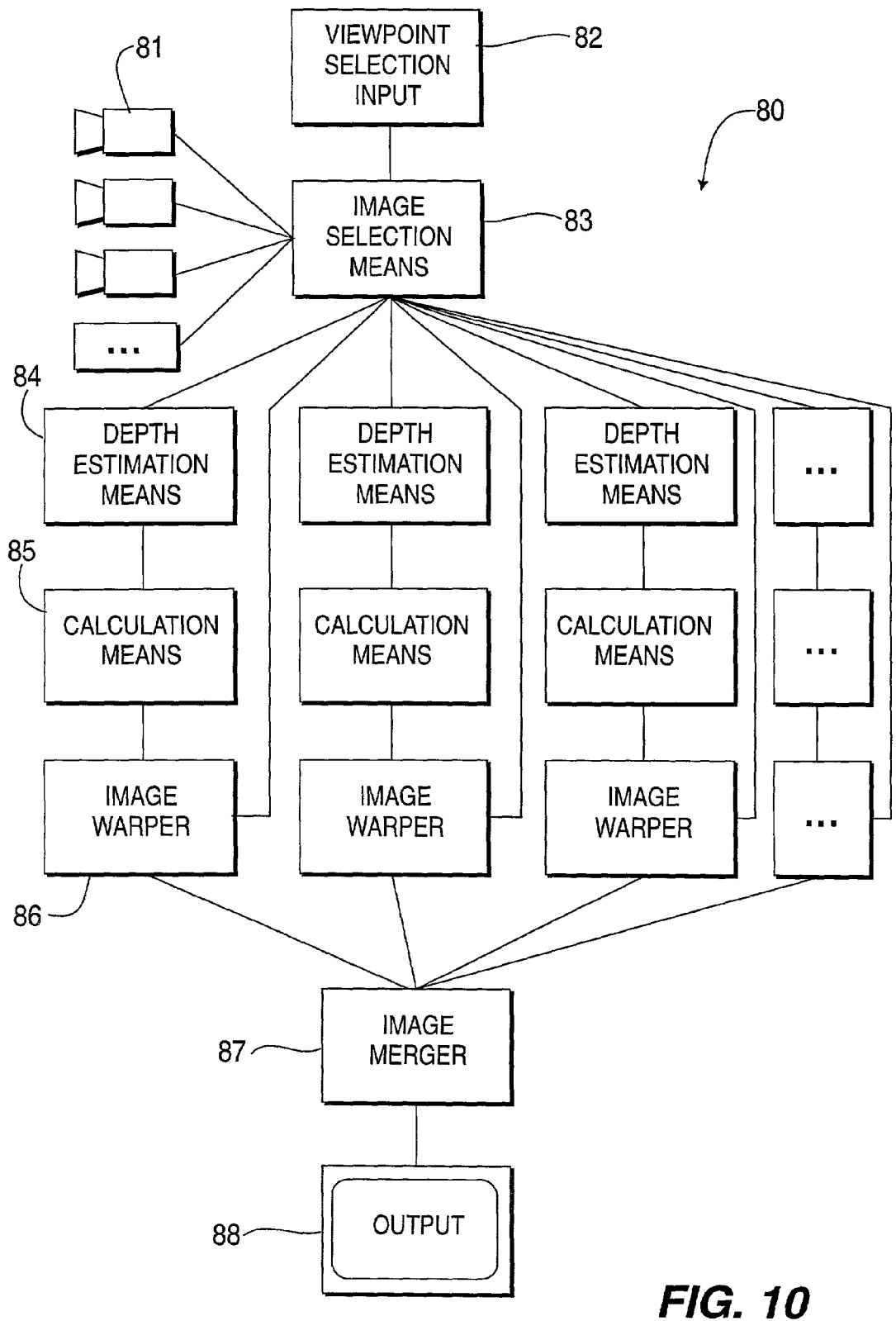
FIG. 10 is a block diagram of the virtual camera system of the present invention.

FIG. 10 is a block diagram of the virtual camera system 80 of the present invention. At least two fixed cameras 81 are used to capture real images. Parameters specifying camera positions, orientations, and resolution can be calculated offline. In an exemplary embodiment of the present invention these cameras 81 are arranged in a video blanket configuration. The viewpoint selection input 82 specifies the position, orientation, and zoom parameters of the high quality virtual image to be created, and also provides control over the image selection means 83. Based on camera and viewpoint parameters, the image selection means 83 next chooses at least two images that will be used to create the high quality virtual image. For each selected image a local depth map is calculated by a depth estimation means 84. Next a calculation means 85 performs the calculation of the warp parameters necessary to warp the real images to the selected viewpoint. Camera and viewpoint parameters as well as information from the local depth maps are used. The warp parameters are then used by the image warper 86 to warp the real images to the selected viewpoint. The processes of depth estimation, warp parameter calculation, and image warping may be carried out serially, or as shown FIG. 10 as a pipelined parallel process. An exemplary embodiment of the present invention uses parallel processing in all three of these elements 84, 85, and 86. Finally an image merger 87 merges the warped images into a high quality virtual image of the scene as seen from the selected viewpoint. The output 88 may be at least one video monitor, video recording device, computer, broadcast system, or combination.

In an exemplary embodiment of the present invention, the virtual camera system 80 is operated using the method described above with reference to FIG. 3.

Figure 11:
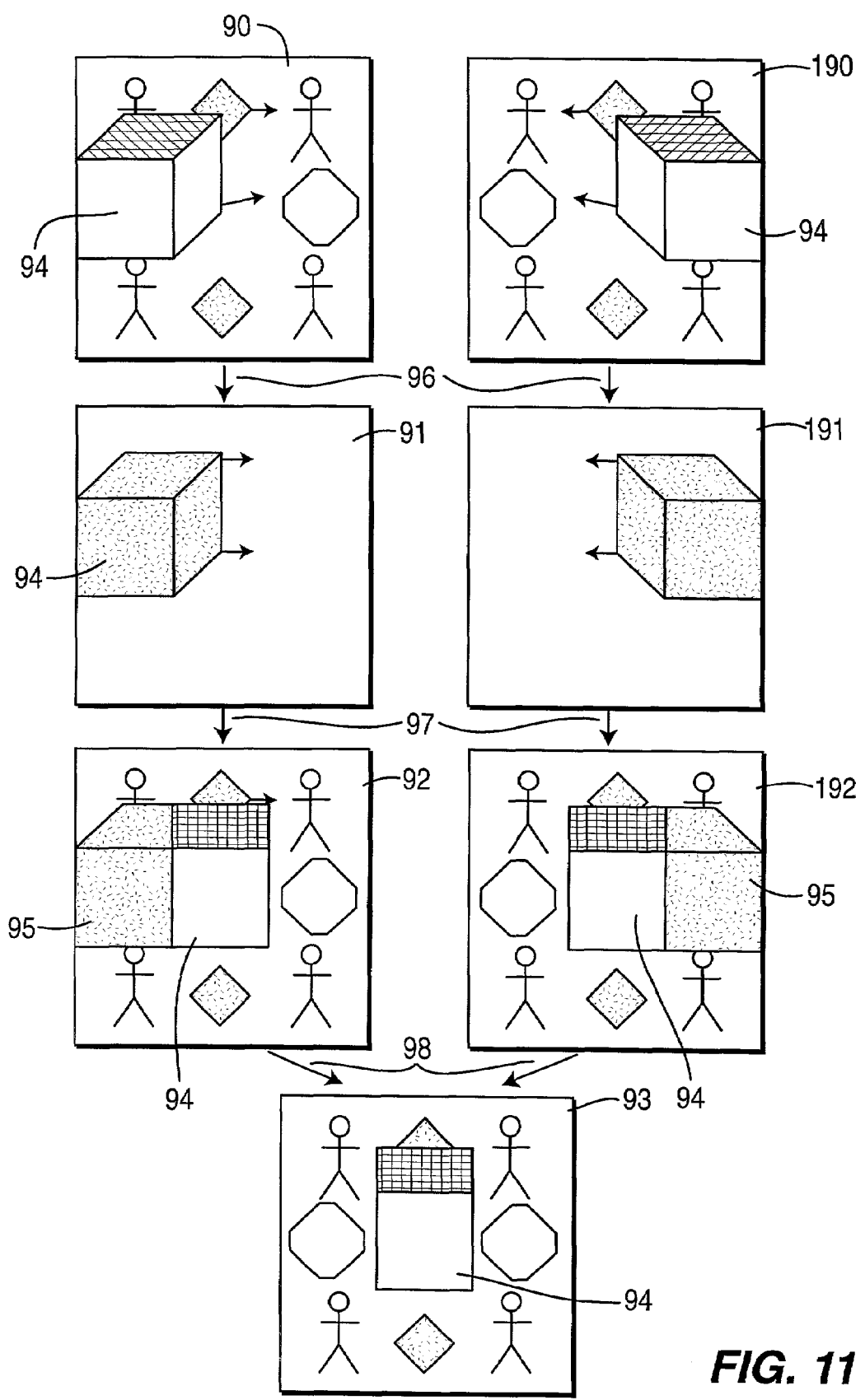
FIG. 11 is a series of drawings demonstrating the steps of image processing employed in the present invention to create a high quality virtual image, from two selected real images.

FIG. 11 is a series of drawings demonstrating the steps of image processing employed in the present invention to create a high quality virtual image 93, from two selected real images 90 and 190. The scene depicted contains a wall and a cube 94, which is suspended in front of the wall. Image 90 shows cube 94 from slightly above and to the right, while image 190 shows cube 94 from slightly above and to the left. In the high quality virtual image 93, cube 94 is seen from slightly above and straight on.

First depth maps 91 and 191 are created by step 96. In the depth maps 91 and 191, the cube 94 is shown to lie at various depths while the wall has a uniform depth. Next warped images 92 and 192 showing the cube 94 from slightly above and straight on are generated in step 97. An occluded region 95 appears in each of the warped images 92 and 192. These occluded regions 95 are portions of the wall which had been occluded by the cube 94 in image 90 and 190. Finally the warped images 92 and 192 are merged in step 98 to create the high quality virtual image 93. In this image the occluded region 95 from image 92 has been filled by using information for that region from warped image 192. The system identifies these occluded regions using differences in the depth map between the two images. Likewise, the occluded region 95 from image 192 has been filled by using information for that region from warped image 92. In this way, this exemplary method of the present invention creates the high quality virtual image without any missing regions.

CONCLUSION

In summary, the present invention demonstrates the feasibility of providing view coverage based on a sparse collection of cameras. The approach relies on local depth sensing, global pose estimation and image-based rendering. Because all the computations involve a local collection of cameras, the algorithms can be easily mapped to hardware and real-time implementations. Therefore, the inventors are able to use video based depth sensing with appropriate imaging parameters, camera configurations and the associated algorithms, to provide a flexible, versatile and cost effective solution for the immersive tele-presence systems.

Although an interactive tele-presence may use all of these improvements in combination, each individually represents an advance of the previous state of the art. As such, it is understood that those skilled in the art may sometimes find it advantageous to use only one or two of these improvements at a time. Such use does not depart from the spirit of the present invention. In the same vein, it will be understood by those skilled in the art that many modifications and variations may be made to the foregoing preferred embodiment without substantially altering the invention.

What is claimed:

1. In a system using a plurality of fixed imagers covering a scene, method to create a high quality virtual image, in real-time, as seen from a virtual viewpoint of the scene, comprising the steps of;

a) selecting at least two images corresponding to at least two of the plurality of fixed imagers to be used in creating the high quality virtual image each of the at least two images corresponding to respective viewpoints different from the virtual viewpoint;

b) creating at least two depth maps corresponding to the at least two images;

c) determining at least two sets of warp parameters using the at least two depth maps corresponding to said at least two images, each set of warp parameters corresponding to warping one of the at least two images to the virtual viewpoint;

d) warping the at least two images to generate at least two warped images representing the virtual viewpoint using the at least two sets of warp parameters corresponding to said at least two images; and e) merging the at least two warped images to create the high quality virtual image representing the virtual viewpoint.

2. The method of claim 1 further comprising the step of selecting the virtual viewpoint based on data supplied by an operator.

3. In a system using a plurality of fixed imagers covering a scene, a method to create a high quality virtual image, in real-time, as seen from a virtual viewpoint of the scene, comprising the steps of;

a) selecting the virtual viewpoint based on tracking at least one feature as the at least one feature moves within the scene;

b) selecting at least two images corresponding to at least two of the plurality of fixed imagers to be used in creating the high quality virtual image each of the least two images corresponding to respective viewpoints different from the virtual viewpoint;

c) creating at least two depth maps corresponding to the at least two images;

d) determining at least two sets of warp parameters using the at least two depth maps corresponding to said at least two images, each set of warp parameters corresponding to warping one of the at least two images to the virtual viewpoint;

e) warping the at least two images to generate at least two warped images representing the virtual viewpoint using the at least two sets of warp parameters corresponding to said at least two images; and f) merging the at least two warped images to create the high quality virtual image representing the virtual viewpoint.

4. The method of claim 1 wherein the steps of creating the at least two depth maps comprises the steps of;

b1) calculating a plurality of optical flow values between the at least two images;

b2) calculating a plurality of parallax values corresponding to a plurality of image coordinates in the at least two images from the plurality of optical flow values; and b3) calculating the at least two depth maps from the plurality of image coordinates and the plurality of parallax values.

5. The method of claim 1 wherein creating the at least two depth maps comprises the steps of;

b1) mounting a plurality of depth sensing sensors viewing the scene coincident with the plurality of fixed imagers;

b2) selecting at least two depth sensing sensors corresponding to the at least two images;

b3) measuring a plurality of depth values corresponding to a plurality of image coordinates in the at least two images with said at least two depth sensing sensors; and b4) creating the at least two depth maps from the plurality of depth values.

6. The method of claim 1 wherein creating the at least two depth maps comprises the steps of;

b1) separating the at least two images into a plurality of segments, pixels of each segment having substantially homogenous values;

b2) calculating a depth value corresponding to each segment;

b3) optimizing the depth values corresponding to each segment; and b4) creating the at least two depth maps from the plurality of optimized depth values.

7. The method of claim 1 wherein the step of selecting the at least two image is based on a proximity of the virtual viewpoint to respective viewpoints corresponding to the at least two images.

8. The method of claim 1 wherein the step of selecting the at least two image selects exactly two images.

9. The method of claim 1 wherein the step of selecting the at least two images selects exactly three images.

10. The method of claim 9 wherein the exactly three images correspond to three fixed imagers from among the plurality affixed imagers arranged in a triangle.

11. The method of claim 1 further comprising the step of placing the plurality of fixed imagers in a geometric pattern.

12. A virtual camera system to create a high quality virtual image, in real-time, as seen from a virtual viewpoint, comprising;

plurality of fixed imagers;

image selection means for selecting an image from each of at least two of the plurality of fixed cameras for use in creating the high quality virtual image each of the selected images corresponding to a respective viewpoint different from the virtual viewpoint; depth estimation means for creating at least two depth maps corresponding to the at least two images;

calculation means for calculating, based on the at least two depth maps, at least two sets of warp parameters that define respective warnings of the at least two images to the virtual viewpoint;

an image warper which applies the at least two sets of warp parameters from the calculation means to the at least two images respectively to create at least two warped images; and an image merger to merge the at least two warped images to generate the high quality virtual image representing the virtual viewpoint.

13. The system of claim 12 wherein the depth estimation means includes view-based volumetric mapping means to create depth maps of the images.

14. The system of claim 12 wherein the depth estimation means includes color segmentation depth calculation means to create depth maps of the images.

15. The system of claim 12 further comprising a plurality of depth sensing sensors aligned to view the scene coincident with the plurality of fixed imagers, whereby the at least two depth maps are generated using data provided by the plurality of depth sensing sensor.

* * * * *